US012484100B2

(12) United States Patent
Kumar

(10) Patent No.: US 12,484,100 B2
(45) Date of Patent: Nov. 25, 2025

(54) ADJUSTING DATA SPLIT BETWEEN NEW RADIO CHANNELS AND LEGACY CHANNELS

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 414 days.

(21) Appl. No.: 18/002,764

(22) PCT Filed: Jul. 16, 2021

(86) PCT No.: PCT/US2021/070889
§ 371 (c)(1),
(2) Date: Dec. 21, 2022

(87) PCT Pub. No.: WO2022/040651
PCT Pub. Date: Feb. 24, 2022

(65) Prior Publication Data
US 2023/0247700 A1 Aug. 3, 2023

(30) Foreign Application Priority Data
Aug. 18, 2020 (IN) .............................. 202041035559

(51) Int. Cl.
H04W 76/15 (2018.01)
H04W 28/08 (2023.01)

(52) U.S. Cl.
CPC .......... H04W 76/15 (2018.02); H04W 28/08 (2013.01)

(58) Field of Classification Search
CPC . H04W 76/15; H04W 28/08; H04W 28/0865; H04W 28/0278; H04W 72/1215; H04W 72/1263; H04B 17/336
See application file for complete search history.

(56) References Cited

U.S. PATENT DOCUMENTS

2019/0254100 A1* 8/2019 Yu .......................... H04W 76/19
2020/0169909 A1 5/2020 Loehr et al.
(Continued)

FOREIGN PATENT DOCUMENTS

WO 2019194528 A1 10/2019
WO 2019212400 A1 11/2019
WO 2020134261 A1 7/2020

OTHER PUBLICATIONS

International Search Report and Written Opinion—PCT/US2021/070889—ISA/EPO—Nov. 5, 2021.

*Primary Examiner* — Walli Z Butt
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indicator of a data split between a New Radio (NR) channel and a legacy channel. Accordingly, the UE may transmit, to the base station, an indicator of a modification of the data split based at least in part on a ratio of an amount of data flowing over the NR channel to a total amount of data flowing over the NR channel and the legacy channel. Additionally, or alternatively, the UE may transmit, to the base station, an indicator of a modification of the data split based at least in part on an indicator of a quality of the legacy channel. Numerous other aspects are provided.

30 Claims, 8 Drawing Sheets

(56) References Cited

U.S. PATENT DOCUMENTS

| | | |
|---|---|---|
| 2020/0205213 A1 | 6/2020 | Marco |
| 2020/0214069 A1 | 7/2020 | Yu et al. |
| 2021/0227376 A1* | 7/2021 | Jha ........................ H04W 8/183 |
| 2022/0053502 A1* | 2/2022 | Wang .................... H04W 28/08 |
| 2023/0308905 A1* | 9/2023 | Teyeb ................... H04L 5/0035 |

* cited by examiner

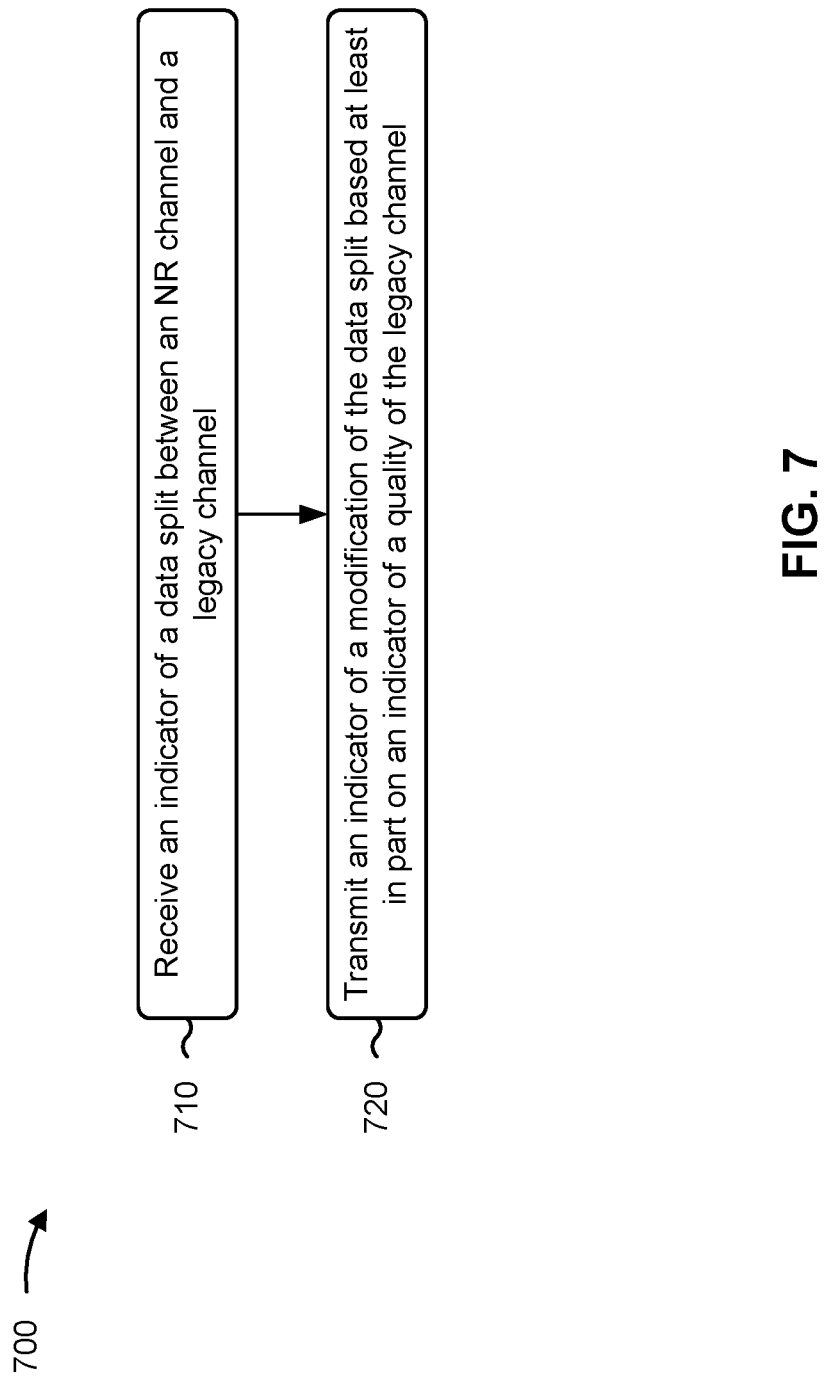

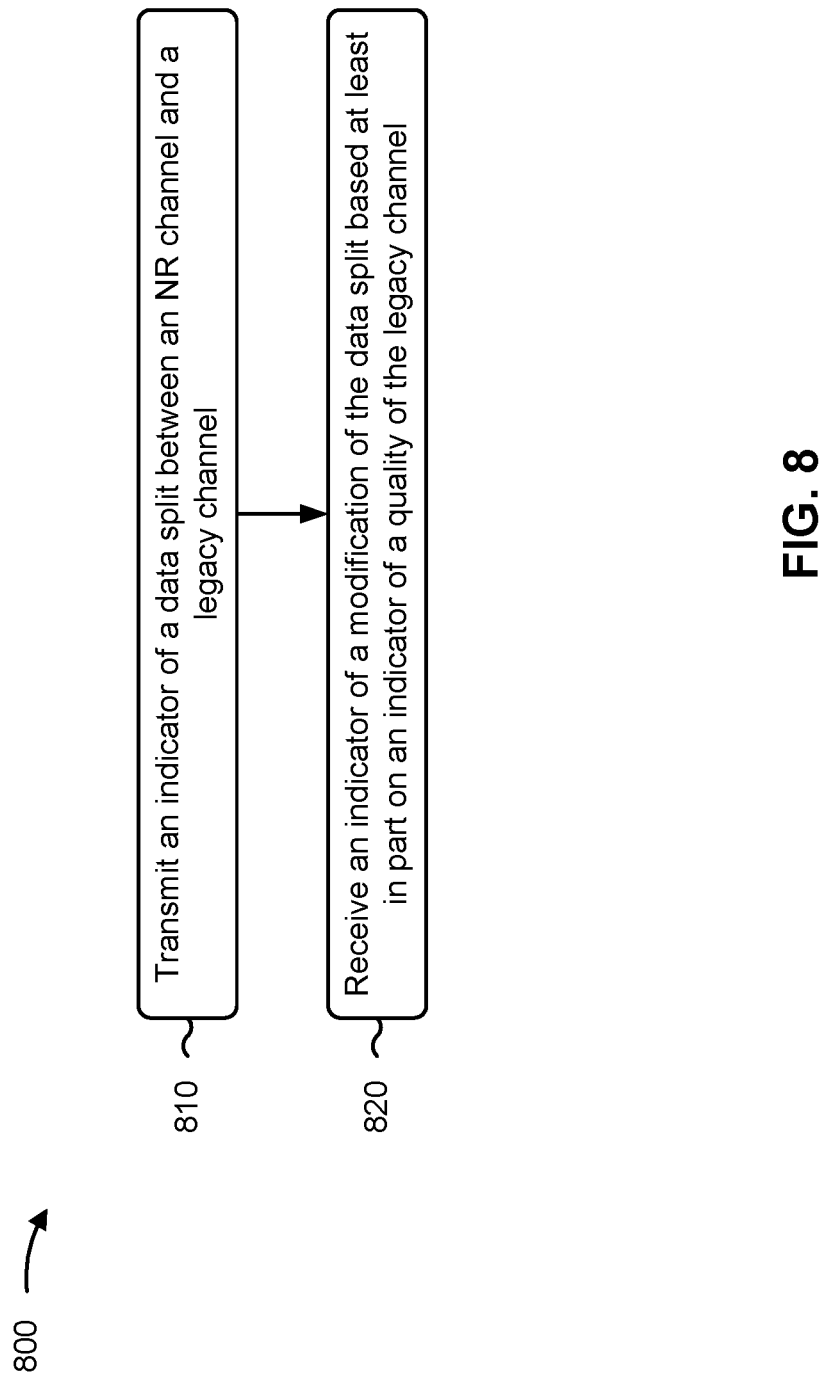

ADJUSTING DATA SPLIT BETWEEN NEW RADIO CHANNELS AND LEGACY CHANNELS

CROSS-REFERENCE TO RELATED APPLICATIONS

This application is a 371 national stage of PCT Application No. PCT/US2021/070889 filed on Jul. 16, 2021, entitled "ADJUSTING DATA SPLIT BETWEEN NEW RADIO CHANNELS AND LEGACY CHANNELS," which claims priority to Indian Patent Application number 202041035559, filed on Aug. 18, 2020, entitled "ADJUSTING DATA SPLIT BETWEEN NEW RADIO CHANNELS AND LEGACY CHANNELS." The disclosure of the prior Applications are considered part of and are hereby expressly incorporated by reference in this Patent Application.

FIELD OF THE DISCLOSURE

Aspects of the present disclosure generally relate to wireless communication and to techniques and apparatuses for adjusting a data split between New Radio channels and legacy channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, an indicator of a data split between a New Radio (NR) channel and a legacy channel; and transmitting, to the base station, an indicator of a modification of the data split based at least in part on a ratio of an amount of data flowing over the NR channel to a total amount of data flowing over the NR channel and the legacy channel.

In some aspects, a method of wireless communication performed by a base station includes transmitting, to a UE, an indicator of a data split between an NR channel and a legacy channel; and receiving, from the UE, an indicator of a modification of the data split based at least in part on a ratio of an amount of data flowing over the NR channel to a total amount of data flowing over the NR channel and the legacy channel.

In some aspects, a method of wireless communication performed by a UE includes receiving, from a base station, an indicator of a data split between an NR channel and a legacy channel; and transmitting, to the base station, an indicator of a modification of the data split based at least in part on an indicator of a quality of the legacy channel.

In some aspects, a method of wireless communication performed by a base station includes transmitting, to a UE, an indicator of a data split between an NR channel and a legacy channel; and receiving, from the UE, an indicator of a modification of the data split based at least in part on an indicator of a quality of the legacy channel.

In some aspects, an apparatus for wireless communication at a UE includes a memory and one or more processors coupled to the memory, the one or more processors configured to receive, from a base station, an indicator of a data split between an NR channel and a legacy channel; and transmit, to the base station, an indicator of a modification of the data split based at least in part on a ratio of an amount of data flowing over the NR channel to a total amount of data flowing over the NR channel and the legacy channel.

In some aspects, an apparatus for wireless communication at a base station includes a memory and one or more processors coupled to the memory, the one or more processors configured to transmit, to a UE, an indicator of a data split between an NR channel and a legacy channel; and receive, from the UE, an indicator of a modification of the data split based at least in part on a ratio of an amount of data flowing over the NR channel to a total amount of data flowing over the NR channel and the legacy channel.

In some aspects, an apparatus for wireless communication at a UE includes a memory and one or more processors coupled to the memory, the one or more processors configured to receive, from a base station, an indicator of a data split between an NR channel and a legacy channel; and transmit, to the base station, an indicator of a modification of the data split based at least in part on an indicator of a quality of the legacy channel.

In some aspects, an apparatus for wireless communication at a base station for wireless communication includes a memory and one or more processors coupled to the memory, the one or more processors configured to transmit, to a UE, an indicator of a data split between an NR channel and a legacy channel; and receive, from the UE, an indicator of a modification of the data split based at least in part on an indicator of a quality of the legacy channel.

In some aspects, a non-transitory computer-readable medium storing a set of instructions for wireless communication includes one or more instructions that, when executed by one or more processors of a UE, cause the UE to receive, from a base station, an indicator of a data split between an NR channel and a legacy channel; and transmit, to the base station, an indicator of a modification of the data split based at least in part on a ratio of an amount of data flowing over the NR channel to a total amount of data flowing over the NR channel and the legacy channel.

In some aspects, a non-transitory computer-readable medium storing a set of instructions for wireless communication includes one or more instructions that, when executed by one or more processors of a base station, cause the base station to transmit, to a UE, an indicator of a data split between an NR channel and a legacy channel; and receive, from the UE, an indicator of a modification of the data split based at least in part on a ratio of an amount of data flowing over the NR channel to a total amount of data flowing over the NR channel and the legacy channel.

In some aspects, a non-transitory computer-readable medium storing a set of instructions for wireless communication includes one or more instructions that, when executed by one or more processors of a UE, cause the UE to receive, from a base station, an indicator of a data split between an NR channel and a legacy channel; and transmit, to the base station, an indicator of a modification of the data split based at least in part on an indicator of a quality of the legacy channel.

In some aspects, a non-transitory computer-readable medium storing a set of instructions for wireless communication includes one or more instructions that, when executed by one or more processors of a base station, cause the base station to transmit, to a UE, an indicator of a data split between an NR channel and a legacy channel; and receive, from the UE, an indicator of a modification of the data split based at least in part on an indicator of a quality of the legacy channel.

In some aspects, an apparatus for wireless communication includes means for receiving, from a base station, an indicator of a data split between an NR channel and a legacy channel; and means for transmitting, to the base station, an indicator of a modification of the data split based at least in part on a ratio of an amount of data flowing over the NR channel to a total amount of data flowing over the NR channel and the legacy channel.

In some aspects, an apparatus for wireless communication includes means for transmitting, to a UE, an indicator of a data split between an NR channel and a legacy channel; and means for receiving, from the UE, an indicator of a modification of the data split based at least in part on a ratio of an amount of data flowing over the NR channel to a total amount of data flowing over the NR channel and the legacy channel.

In some aspects, an apparatus for wireless communication includes means for receiving, from a base station, an indicator of a data split between an NR channel and a legacy channel; and means for transmitting, to the base station, an indicator of a modification of the data split based at least in part on an indicator of a quality of the legacy channel.

In some aspects, an apparatus for wireless communication includes means for transmitting, to a UE, an indicator of a data split between an NR channel and a legacy channel; and means for receiving, from the UE, an indicator of a modification of the data split based at least in part on an indicator of a quality of the legacy channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5, 6, 7, and 8 are diagrams illustrating example processes associated with adjusting a data split between NR channels and legacy channels, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
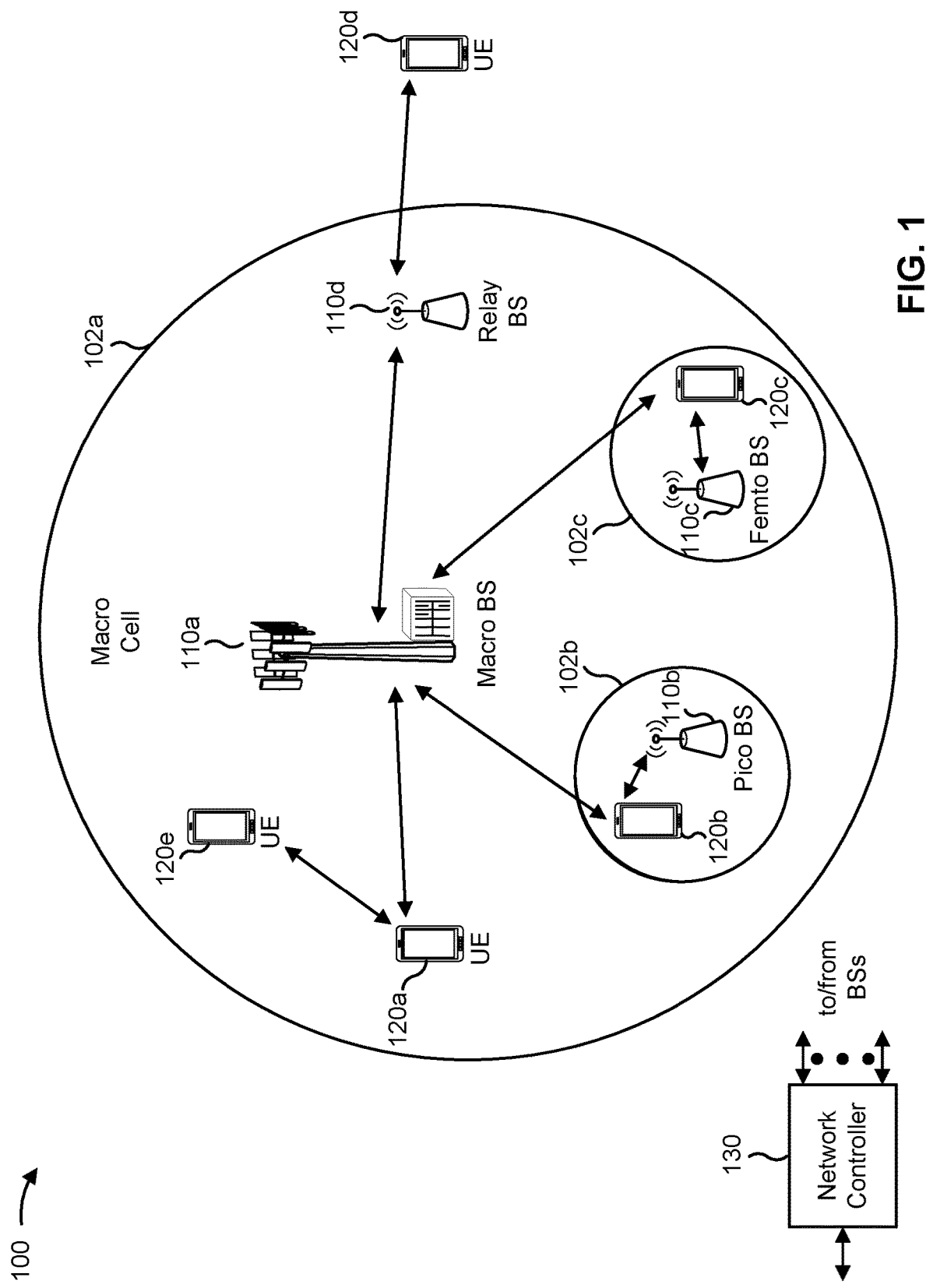
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an Ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band.

Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
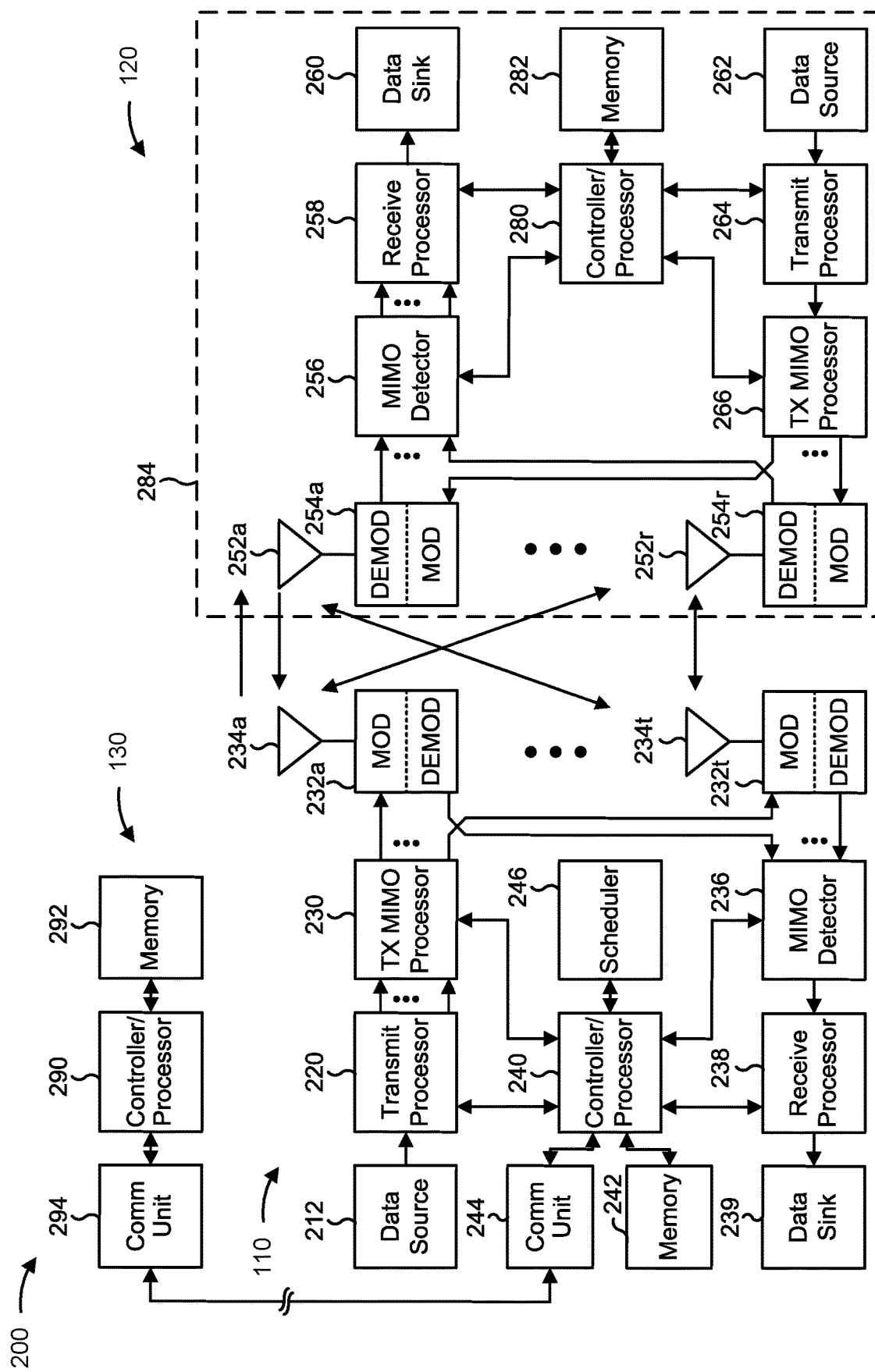
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 4-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 4-8).

Controller/processor 240 of base station 110, controller/processor 280 of UE 120, and/or any other component(s) of FIG. 2 may perform one or more techniques associated with adjusting a data split between NR channels and legacy channels, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a UE (e.g., the UE 120) may include means for receiving, from a base station (e.g., the base station 110), an indicator of a data split between an NR channel and a legacy channel; and/or means for transmitting, to the base station, an indicator of a modification of the data split based at least in part on a ratio of an amount of data flowing over the NR channel to a total amount of data flowing over the NR channel and the legacy channel. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a base station (e.g., the base station 110) may include means for transmitting, to a UE (e.g., the UE 120), an indicator of a data split between an NR channel and a legacy channel; and/or means for receiving, from the UE, an indicator of a modification of the data split based at least in part on a ratio of an amount of data flowing over the NR channel to a total amount of data flowing over the NR channel and the legacy channel. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, a UE (e.g., the UE 120) may include means for receiving, from a base station (e.g., the base station 110), an indicator of a data split between an NR channel and a legacy channel; and/or means for transmitting, to the base station, an indicator of a modification of the data split based at least in part on an indicator of a quality of the legacy channel. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a base station (e.g., the base station 110) may include means for transmitting, to a UE (e.g., the UE 120), an indicator of a data split between an NR channel and a legacy channel; and/or means for receiving, from the UE, an indicator of a modification of the data split based at least in part on an indicator of a quality of the legacy channel. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
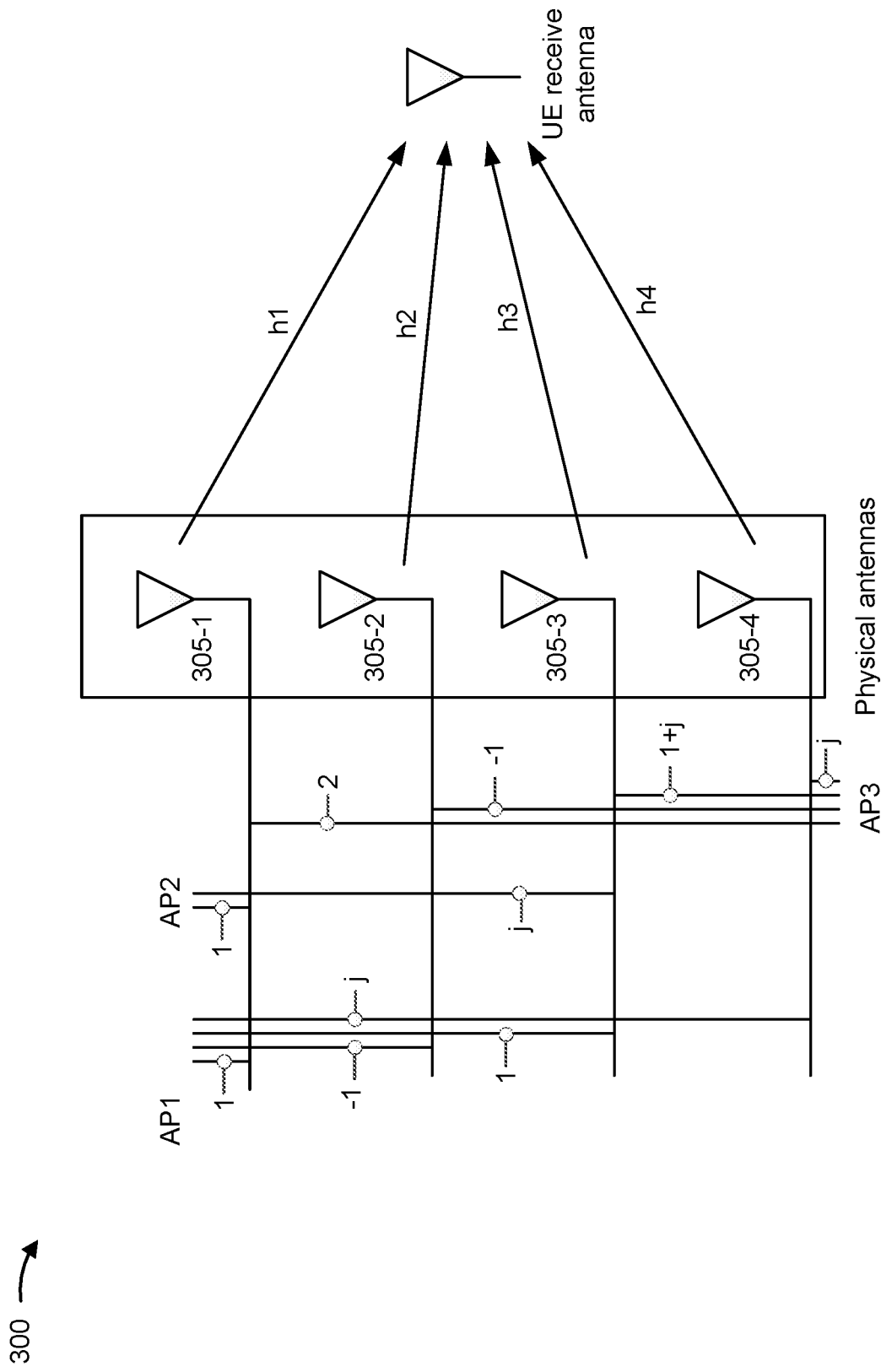
FIG. 3 is a diagram illustrating an example of antenna ports, in accordance with the present disclosure.

FIG. 3 is a diagram illustrating an example 300 of antenna ports, in accordance with the present disclosure. As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 300, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and a precoder may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 3 is provided merely as an example. Other examples may differ from what is described with regard to FIG. 3.

In some situations, a UE may support concurrent operation on an NR channel and a legacy channel (e.g., an LTE channel, a 4G channel, a 3G channel, and/or another channel that is legacy with respect to the NR channel). Moreover, the UE may use antenna switching (e.g., using multiple antenna ports, as described above in connection with FIG. 3), such as 1T4R antenna switching (e.g., where one sounding reference signal (SRS) port has a corresponding SRS resource of four SRS resources, and each SRS resource is associated with a different antenna port of the UE) and/or another type of antenna switching. For example, on an evolved universal mobile telecommunications system (UMTS) terrestrial radio access network (RAN) (also referred to as E-UTRAN), the UE may support band N41 (e.g., approximately 2496-2690 MHz) and/or another similar band on the NR channel in combination with band B3 (e.g., approximately 1800 MHz) and/or another similar band on an LTE channel. In another example, on an E-UTRAN, the UE may support band N41 (e.g., approximately 2496-2690 MHz) and/or another similar band on the NR channel in combination with band B39 (e.g., approximately 1900 MHz) and/or another similar band on the LTE channel.

However, in order to support antenna switching (e.g., 1T4R antenna switching) on the NR channel, the UE generally will blank reception occasions and/or transmission occasions on the legacy channel during SRS reception and/or transmission on the NR channel. This is because the UE antenna ports used by the NR channel usually conflict with those required by the legacy channel for reception, transmission, or both. The UE, however, suffers decreased quality and/or reliability of communications when the UE blanks the legacy channel.

Some techniques and apparatuses described herein enable a UE (e.g., UE 120) to dynamically split data between an NR channel and a legacy channel based at least in part on a ratio of an amount of data flowing over the NR channel to a total amount of data flowing over the NR channel and the legacy channel and/or based at least in part on a condition of the legacy channel. Accordingly, the UE 120 may improve quality and/or reliability of communications with a base station (e.g., base station 110) by modifying a data split between the NR channel and the legacy channel. For example, the UE 120 may request additional resources for the NR channel when blanking the legacy channel. As a result, the UE 120 increases throughput, quality, and/or reliability on the NR channel. As an alternative, the UE 120 may downgrade the NR channel (e.g., from 1T4R to 1T2R, in which one SRS port has a corresponding SRS resource of two SRS resources, and each SRS resource is associated with a different antenna port of the UE 120) when refraining from blanking the legacy channel. As a result, the UE 120 increases quality and/or reliability on the legacy channel.

Figure 4:
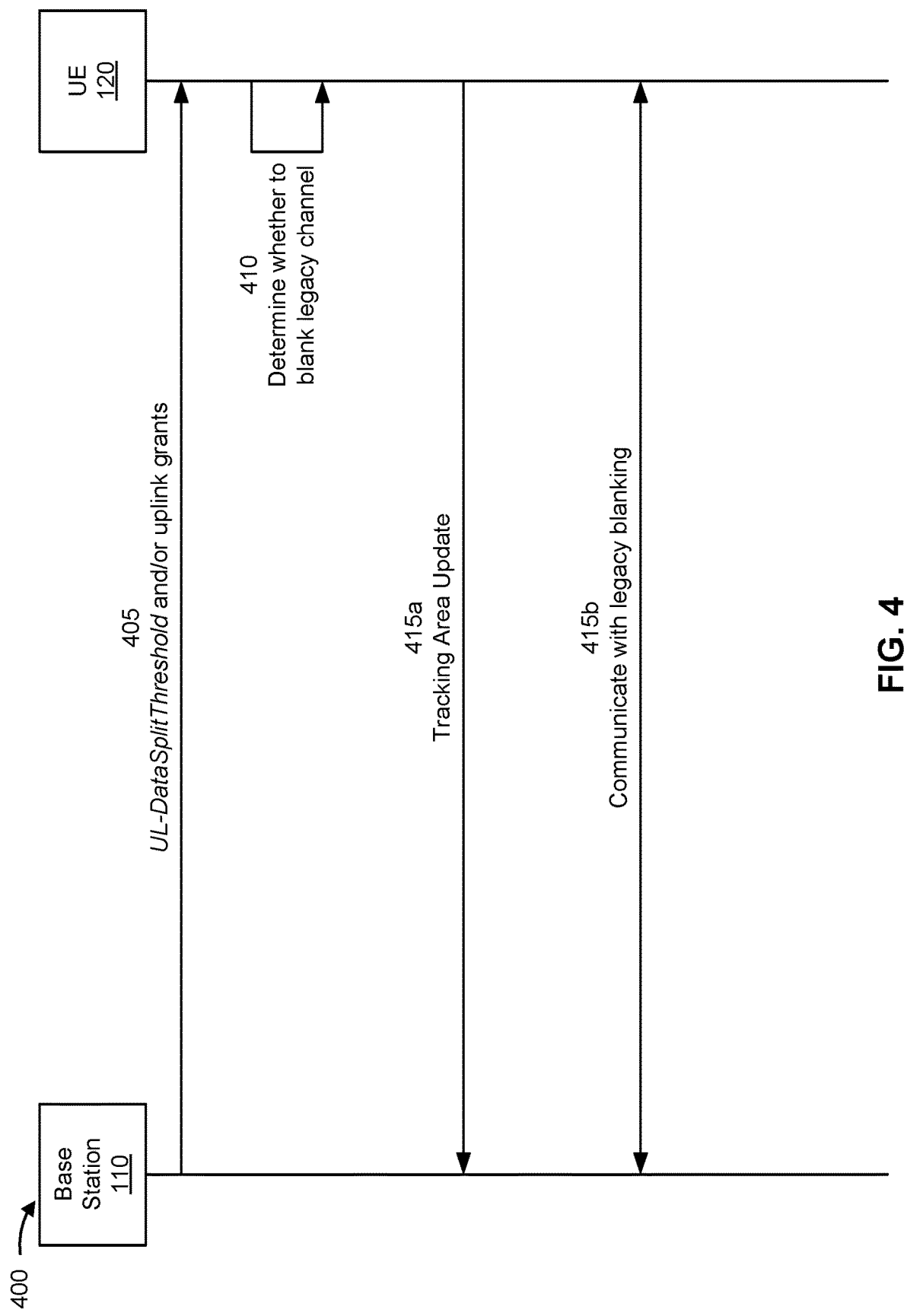
FIG. 4 is a diagram illustrating an example associated with adjusting a data split between New Radio (NR) channels and legacy channels, in accordance with the present disclosure.

FIG. 4 is a diagram illustrating an example 400 associated with adjusting a data split between an NR channel and a legacy channel, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate on a wireless access link, which may include an uplink and a downlink.

In some aspects, the base station 110 and the UE 120 may communicate on an NR channel as well as a legacy channel (e.g., an LTE channel, a 4G channel, a 3G channel, and/or another channel that is legacy relative to the NR channel). Accordingly, the base station 110 and the UE 120 may be dual connected (e.g., in an E-UTRAN NR dual connectivity (ENDC) mode and/or another dual connectivity mode). In some aspects, the NR channel and the legacy channel may include downlink channels from the base station 110 to the UE 120. Additionally, or alternatively, the NR channel and the legacy channel may include uplink channels from the UE 120 to the base station 110.

In some aspects, the legacy channel may include an LTE channel. Although the description below will focus on an LTE channel, the description applies equally to other legacy channels, such as a 4G channel and/or a 3G channel.

As shown in connection with reference number 405, the base station 110 may transmit, and the UE 120 may receive, an indicator of a data split between the NR channel and the LTE channel. In some aspects, the indicator may be explicit. For example, the indicator may include a UL-DataSplit-Threshold variable and/or another similar variable (e.g., as defined in 3GPP specifications and/or another standard) that divides uplink and/or downlink data between the NR channel and the LTE channel. Additionally, or alternatively, the indicator may be implicit. For example, a quantity of resources granted from the base station 110 to the UE 120 on a downlink channel and/or an uplink channel may implicitly divide downlink and/or uplink data, respectively, between the NR channel and the LTE channel (e.g., based at least in part on a quantity of NR resources granted by the base station 110 as compared with a quantity of LTE resources granted by the base station 110).

As shown in connection with reference number 410, the UE 120 may determine whether to blank the LTE channel. The UE 120 may perform the determination based at least in part on a ratio of an amount of data flowing over the NR channel to a total amount of data flowing over the NR channel and the LTE channel; a quantity of downlink layers on the NR channel; and/or an indicator of a quality of the LTE channel (e.g., a signal-to-noise ratio (SNR), a signal-to-interference-and-noise ratio (SINR), and/or another quality indicator).

In some aspects, the UE 120 may blank the LTE channel when the ratio satisfies a data threshold. In some aspects, the UE 120 may be programmed and/or otherwise preconfigured with the data threshold (e.g., according to 3GPP specifications and/or another standard). Additionally, or alternatively, the UE 120 may determine the data threshold dynamically. For example, the UE 120 may adjust the data threshold based at least in part on the quantity of downlink layers on the NR channel (e.g., decreasing the data threshold when the quantity of downlink layers is larger and increasing the data threshold when the quantity of downlink layers is smaller) and/or based at least in part on the indicator of a quality of the LTE channel (e.g., increasing the data threshold when the quality of the LTE channel is higher and decreasing the data threshold when the quality of the LTE channel is lower). Similarly, the UE 120 may downgrade the NR channel (e.g., from 1T4R to 1T2R) when the ratio does not satisfy the data threshold.

Additionally, or alternatively, the UE 120 may blank the LTE channel when the quantity of downlink layers on the NR channel satisfies a layer threshold. In some aspects, the UE 120 may be programmed and/or otherwise preconfigured with the layer threshold (e.g., according to 3GPP specifications and/or another standard). Additionally, or alternatively, the UE 120 may determine the layer threshold dynamically. For example, the UE 120 may adjust the layer threshold based at least in part on the ratio of an amount of data flowing over the NR channel to a total amount of data flowing over the NR channel and the LTE channel (e.g., decreasing the layer threshold when the ratio is larger and increasing the layer threshold when the ratio is smaller) and/or based at least in part on the indicator of a quality of the LTE channel (e.g., increasing the layer threshold when the quality of the LTE channel is higher and decreasing the layer threshold when the quality of the LTE channel is lower). Similarly, the UE 120 may downgrade the NR channel (e.g., from 1T4R to 1T2R) when the quantity of downlink layers on the NR channel does not satisfy the layer threshold.

Additionally, or alternatively, the UE 120 may blank the LTE channel when the indicator of a quality of the LTE channel does not satisfy a quality threshold. In some aspects, the UE 120 may be programmed and/or otherwise preconfigured with the quality threshold (e.g., according to 3GPP specifications and/or another standard). Additionally, or alternatively, the UE 120 may determine the quality threshold dynamically. For example, the UE 120 may adjust the quality threshold based at least in part on the ratio of an amount of data flowing over the NR channel to a total amount of data flowing over the NR channel and the LTE channel (e.g., increasing the quality threshold when the ratio is larger and decreasing the quality threshold when the ratio is smaller) and/or based at least in part on the quantity of downlink layers on the NR channel (e.g., increasing the quality threshold when the quantity of downlink layers is larger and decreasing the quality threshold when the quantity of downlink layers is smaller). Similarly, the UE 120 may downgrade the NR channel (e.g., from 1T4R to 1T2R) when the indicator of a quality of the LTE channel satisfies the quality threshold.

Any of the conditions described above may be combined. In addition to, or in lieu of, the combinations described above, some or all of the conditions described above may be joined using AND operators. For example, the UE 120 may blank the LTE channel when the quantity of downlink layers on the NR channel satisfies a layer threshold and the ratio of an amount of data flowing over the NR channel to a total amount of data flowing over the NR channel and the LTE channel satisfies a data threshold. Otherwise, the UE 120 may downgrade the NR channel (e.g., from 1T4R to 1T2R). In another example, the UE 120 may blank the LTE channel when the quantity of downlink layers on the NR channel satisfies a layer threshold and the indicator of a quality of the LTE channel does not satisfy a quality threshold. Otherwise, the UE 120 may downgrade the NR channel (e.g., from 1T4R to 1T2R). In yet another example, the UE 120 may blank the LTE channel when the ratio of an amount of data flowing over the NR channel to a total amount of data flowing over the NR channel and the LTE channel satisfies a data threshold and the indicator of a quality of the LTE channel does not satisfy a quality threshold. Otherwise, the UE 120 may downgrade the NR channel (e.g., from 1T4R to 1T2R).

Additionally, or alternatively, some or all of the conditions described above may be joined using OR operators. For example, the UE 120 may blank the LTE channel when the quantity of downlink layers on the NR channel satisfies a layer threshold or the ratio of an amount of data flowing over the NR channel to a total amount of data flowing over the NR channel and the LTE channel satisfies a data threshold. Otherwise, the UE 120 may downgrade the NR channel (e.g., from 1T4R to 1T2R). In another example, the UE 120 may blank the LTE channel when the quantity of downlink layers on the NR channel satisfies a layer threshold or the indicator of a quality of the LTE channel does not satisfy a quality threshold. Otherwise, the UE 120 may downgrade the NR channel (e.g., from 1T4R to 1T2R). In yet another example, the UE 120 may blank the LTE channel when the ratio of an amount of data flowing over the NR channel to a total amount of data flowing over the NR channel and the LTE channel satisfies a data threshold or the indicator of a quality of the LTE channel does not satisfy a quality threshold. Otherwise, the UE 120 may downgrade the NR channel (e.g., from 1T4R to 1T2R).

In some aspects, one or more of the conditions described above may be prioritized over one or more others of the conditions described above. For example, the UE 120 may downgrade the NR channel (e.g., from 1T4R to 1T2R) when the indicator of a quality of the LTE channel satisfies a quality threshold. Otherwise, the UE 120 may still downgrade the NR channel (e.g., from 1T4R to 1T2R) when the quantity of downlink layers on the NR channel does not satisfy a layer threshold and/or the ratio of an amount of data flowing over the NR channel to a total amount of data flowing over the NR channel and the LTE channel does not satisfy a data threshold. In another example, the UE 120 may blank the LTE channel when the quantity of downlink layers on the NR channel satisfies a layer threshold and the ratio of an amount of data flowing over the NR channel to a total amount of data flowing over the NR channel and the LTE channel satisfies a data threshold. Otherwise, the UE 120 may still blank the LTE channel when the indicator of a quality of the LTE channel does not satisfy a quality threshold.

Based at least in part on the determination described above in connection with reference number 410, the UE 120 may transmit, and the base station 110 may receive, an indicator of the modification of the data split. In some aspects, the indicator of the modification may include a UECapabilityMessage (e.g., as defined by 3GPP specifications and/or another standard) or another similar capability message that indicates the UE 120 does not have a 1T4R capability for the NR channel but has a 1T2R capability for the NR channel.

Accordingly, in some aspects, the indicator of the modification may cause the base station 110 to downgrade a capability associated with the NR channel and/or cause the UE 120 to operate without blanking for the legacy channel. In some aspects, as shown in connection with reference number 415*a*, the indicator of the modification may include a tracking area update (TAU). Accordingly, in response to the TAU, the base station 110 may reestablish the NR channel with the UE 120 with the downgraded capability. By downgrading the capability, the UE 120 may eliminate conflict between the UE antenna ports used by the NR channel and those required by the LTE channel for reception, transmission, or both. As a result, quality and/or reliability on the LTE channel is increased, which conserves network resources as well as power and processing resources consumed by the UE 120 for the LTE channel.

As an alternative, and as shown in connection with reference number 415*b*, the indicator of the modification may cause the UE 120 to transmit more data on the NR channel and to operate with blanking for the LTE channel. For example, the indicator of the modification may include at least one of a modified buffer status report (BSR), a request for one or more additional uplink grants from the base station 110, or a combination thereof. Accordingly, the UE 120 may transmit the modified BSR to the base station 110 to indicate that the UE 120 is requesting additional data over the NR channel and fewer data over the LTE channel. Additionally, or alternatively, the UE 120 may transmit one or more grant requests to the base station 110 for additional resources on the NR channel to increase throughput on the NR channel such that the increased throughput compensates for the LTE blanking. As a result, throughput on the NR channel is increased, which reduces latency on the NR channel.

By using techniques as described in connection with FIG. 4, the UE 120 can improve quality and/or reliability of communications with the base station 110 by modifying a data split between the NR channel and the LTE channel. For example, as described above in connection with reference number 415*b*, the UE 120 can request additional resources for the NR channel when blanking the LTE channel, which increases throughput and reduces latency on the NR channel. As an alternative, and as described above in connection with reference number 415*a*, the UE 120 can downgrade the NR channel (e.g., from 1T4R to 1T2R) when refraining from blanking the LTE channel, which increases quality and/or reliability on the LTE channel.

As indicated above, FIG. 4 is provided as an example. Other examples may differ from what is described with respect to FIG. 4.

Figure 5:
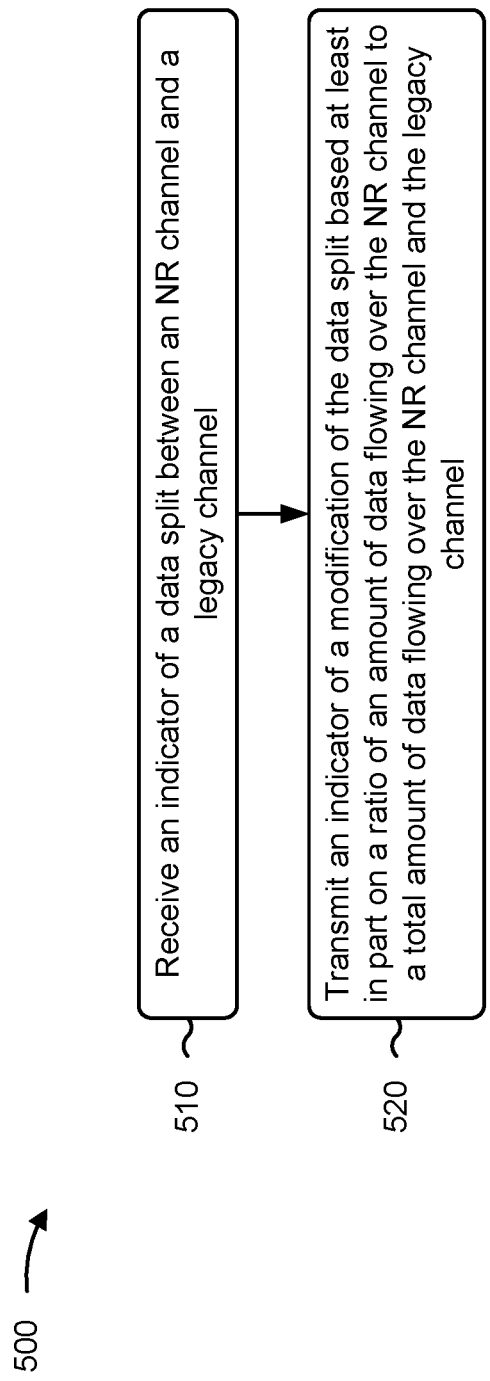

FIG. 5 is a diagram illustrating an example process 500 performed, for example, by a UE, in accordance with the present disclosure. Example process 500 is an example where the UE (e.g., UE 120) performs operations associated with adjusting a data split between an NR channel and a legacy channel.

As shown in FIG. 5, in some aspects, process 500 may include receiving, from a base station (e.g., base station 110), an indicator of a data split between an NR channel and a legacy channel (block 510). For example, the UE (e.g., using antenna 252, demodulator 254, MIMO detector 256, receive processor 258, controller/processor 280, and/or memory 282) may receive, from a base station, an indicator of a data split between an NR channel and a legacy channel, as described herein.

As further shown in FIG. 5, in some aspects, process 500 may include transmitting, to the base station, an indicator of a modification of the data split based at least in part on a ratio of an amount of data flowing over the NR channel to a total amount of data flowing over the NR channel and the legacy channel (block 520). For example, the UE (e.g., using antenna 252, transmit processor 264, TX MIMO processor 266, modulator 254, controller/processor 280, and/or memory 282) may transmit, to the base station, an indicator of a modification of the data split based at least in part on a ratio of an amount of data flowing over the NR channel to a total amount of data flowing over the NR channel and the legacy channel, as described herein.

Process 500 may include additional aspects, such as any single aspect or any combination of aspects described below and/or in connection with one or more other processes described elsewhere herein.

In a first aspect, the NR channel and the legacy channel include downlink channels.

In a second aspect, alone or in combination with the first aspect, the indicator of the modification is further based at least in part on a quantity of downlink layers on the NR channel.

In a third aspect, alone or in combination with one or more of the first and second aspects, the indicator of the modification causes the base station to downgrade (e.g., using transmit processor 220, TX MIMO processor 230, modulator 232, antenna 234, demodulator 232, MIMO detector 236, receive processor 238, controller/processor 240, memory 242, and/or scheduler 246) a capability associated with the NR channel and causes the UE to operate (e.g., using antenna 252, demodulator 254, MIMO detector 256, receive processor 258, transmit processor 264, TX MIMO processor 266, modulator 254, controller/processor 280, and/or memory 282) without blanking for the legacy channel.

In a fourth aspect, alone or in combination with one or more of the first through third aspects, the NR channel and the legacy channel include uplink channels.

In a fifth aspect, alone or in combination with one or more of the first through fourth aspects, the indicator of the modification causes the UE to transmit (e.g., using antenna 252, transmit processor 264, TX MIMO processor 266, modulator 254, controller/processor 280, and/or memory 282) more data on the NR channel and to operate (e.g., using antenna 252, demodulator 254, MIMO detector 256, receive processor 258, transmit processor 264, TX MIMO processor 266, modulator 254, controller/processor 280, and/or memory 282) with blanking for the legacy channel.

In a sixth aspect, alone or in combination with one or more of the first through fifth aspects, the indicator of the modification includes at least one of a modified BSR or a request for one or more additional uplink grants from the base station.

In a seventh aspect, alone or in combination with one or more of the first through sixth aspects, the indicator of the modification includes a TAU.

In an eighth aspect, alone or in combination with one or more of the first through seventh aspects, the indicator of the modification of the data split is further based at least in part on an indicator of a quality of the legacy channel.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
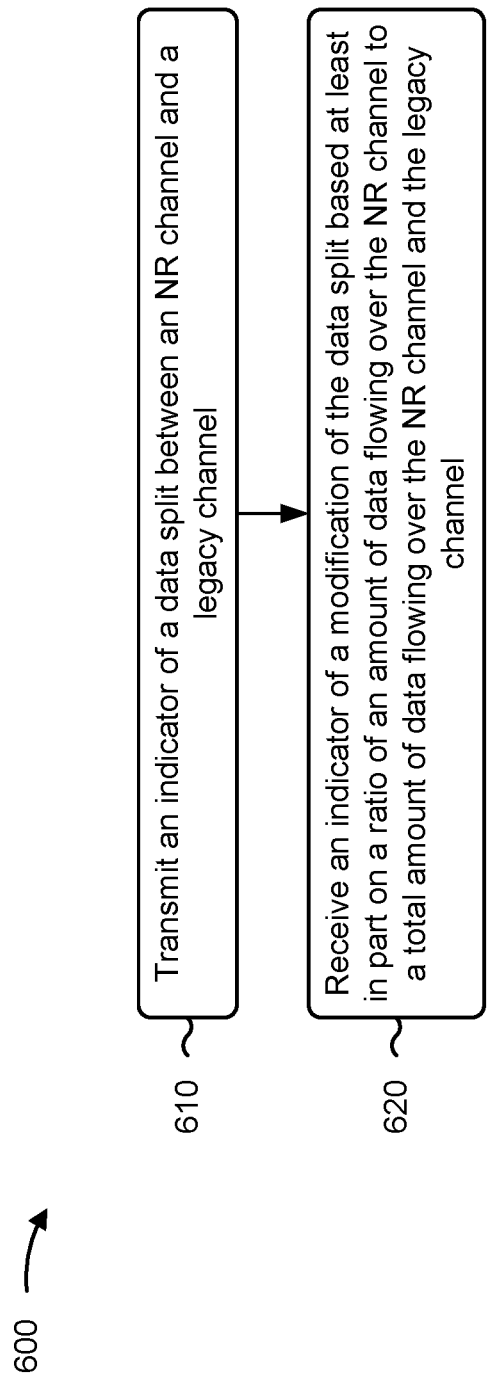

FIG. 6 is a diagram illustrating an example process 600 performed, for example, by a base station, in accordance with the present disclosure. Example process 600 is an example where the base station (e.g., base station 110) performs operations associated with adjusting a data split between an NR channel and a legacy channel.

As shown in FIG. 6, in some aspects, process 600 may include transmitting, to a UE (e.g., UE 120), an indicator of a data split between an NR channel and a legacy channel (block 610). For example, the base station (e.g., using transmit processor 220, TX MIMO processor 230, modulator 232, antenna 234, controller/processor 240, memory 242, and/or scheduler 246) may transmit, to a UE, an indicator of a data split between an NR channel and a legacy channel, as described herein.

As further shown in FIG. 6, in some aspects, process 600 may include receiving, from the UE, an indicator of a modification of the data split based at least in part on a ratio of an amount of data flowing over the NR channel to a total amount of data flowing over the NR channel and the legacy channel (block 620). For example, the base station (e.g., using antenna 234, demodulator 232, MIMO detector 236, receive processor 238, controller/processor 240, and/or memory 242) may receive, from the UE, an indicator of a modification of the data split based at least in part on a ratio of an amount of data flowing over the NR channel to a total amount of data flowing over the NR channel and the legacy channel, as described herein.

Process 600 may include additional aspects, such as any single aspect or any combination of aspects described below and/or in connection with one or more other processes described elsewhere herein.

In a first aspect, the NR channel and the legacy channel include downlink channels.

In a second aspect, alone or in combination with the first aspect, the indicator of the modification is further based at least in part on a quantity of downlink layers on the NR channel.

In a third aspect, alone or in combination with one or more of the first and second aspects, the indicator of the modification causes the base station to downgrade (e.g., using transmit processor 220, TX MIMO processor 230, modulator 232, antenna 234, demodulator 232, MIMO detector 236, receive processor 238, controller/processor 240, memory 242, and/or scheduler 246) a capability associated with the NR channel and causes the UE to operate (e.g., using antenna 252, demodulator 254, MIMO detector 256, receive processor 258, transmit processor 264, TX MIMO processor 266, modulator 254, controller/processor 280, and/or memory 282) without blanking for the legacy channel.

In a fourth aspect, alone or in combination with one or more of the first through third aspects, the NR channel and the legacy channel include uplink channels.

In a fifth aspect, alone or in combination with one or more of the first through fourth aspects, the indicator of the modification causes the UE to transmit (e.g., using antenna 252, transmit processor 264, TX MIMO processor 266, modulator 254, controller/processor 280, and/or memory 282) more data on the NR channel and to operate (e.g., using antenna 252, demodulator 254, MIMO detector 256, receive processor 258, transmit processor 264, TX MIMO processor 266, modulator 254, controller/processor 280, and/or memory 282) with blanking for the legacy channel.

In a sixth aspect, alone or in combination with one or more of the first through fifth aspects, the indicator of the modification includes at least one of a modified BSR or a request for one or more additional uplink grants from the base station.

In a seventh aspect, alone or in combination with one or more of the first through sixth aspects, the indicator of the modification includes a TAU.

In an eighth aspect, alone or in combination with one or more of the first through seventh aspects, the indicator of the modification of the data split is further based at least in part on an indicator of a quality of the legacy channel.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a UE, in accordance with the present disclosure. Example process 700 is an example where the UE (e.g., UE 120) performs operations associated with adjusting a data split between an NR channel and a legacy channel.

As shown in FIG. 7, in some aspects, process 700 may include receiving, from a base station (e.g., base station 110), an indicator of a data split between an NR channel and a legacy channel (block 710). For example, the UE (e.g., using antenna 252, demodulator 254, MIMO detector 256, receive processor 258, controller/processor 280, and/or memory 282) may receive, from a base station, an indicator of a data split between an NR channel and a legacy channel, as described herein.

As further shown in FIG. 7, in some aspects, process 700 may include transmitting, to the base station, an indicator of a modification of the data split based at least in part on an indicator of a quality of the legacy channel (block 720). For example, the UE (e.g., using antenna 252, transmit processor 264, TX MIMO processor 266, modulator 254, controller/processor 280, and/or memory 282) may transmit, to the base station, an indicator of a modification of the data split based at least in part on the indicator of a quality of the legacy channel, as described herein.

Process 700 may include additional aspects, such as any single aspect or any combination of aspects described below and/or in connection with one or more other processes described elsewhere herein.

In a first aspect, the indicator of the quality of the legacy channel includes an SNR.

In a second aspect, alone or in combination with the first aspect, the indicator of the modification is further based at least in part on a proportion of data flowing over the NR channel to a total amount of data flowing over the NR channel and the legacy channel.

In a third aspect, alone or in combination with one or more of the first and second aspects, the indicator of the modification causes the base station to downgrade (e.g., using transmit processor 220, TX MIMO processor 230, modulator 232, antenna 234, demodulator 232, MIMO detector 236, receive processor 238, controller/processor 240, memory 242, and/or scheduler 246) a capability associated with the NR channel and causes the UE to operate (e.g., using antenna 252, demodulator 254, MIMO detector 256, receive processor 258, transmit processor 264, TX MIMO processor 266, modulator 254, controller/processor 280, and/or memory 282) without blanking for the legacy channel.

In a fourth aspect, alone or in combination with one or more of the first through third aspects, the indicator of the modification includes a TAU.

In a fifth aspect, alone or in combination with one or more of the first through fourth aspects, the indicator of the modification is further based at least in part on a quantity of downlink layers on the NR channel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with the present disclosure. Example process 800 is an example where the base station (e.g., base station 110) performs operations associated with adjusting a data split between an NR channel and a legacy channel.

As shown in FIG. 8, in some aspects, process 800 may include transmitting, to a UE (e.g., UE 120), an indicator of a data split between an NR channel and a legacy channel (block 810). For example, the base station (e.g., using transmit processor 220, TX MIMO processor 230, modulator 232, antenna 234, controller/processor 240, memory 242, and/or scheduler 246) may transmit, to a UE, an indicator of a data split between an NR channel and a legacy channel, as described herein.

As further shown in FIG. 8, in some aspects, process 800 may include receiving, from the UE, an indicator of a modification of the data split based at least in part on an indicator of a quality of the legacy channel (block 820). For example, the base station (e.g., using antenna 234, demodulator 232, MIMO detector 236, receive processor 238, controller/processor 240, and/or memory 242) may receive, from the UE, an indicator of a modification of the data split based at least in part on the indicator of a quality of the legacy channel, as described herein.

Process 800 may include additional aspects, such as any single aspect or any combination of aspects described below and/or in connection with one or more other processes described elsewhere herein.

In a first aspect, the indicator of the quality of the legacy channel includes an SNR.

In a second aspect, alone or in combination with the first aspect, the indicator of the modification is further based at least in part on a proportion of data flowing over the NR channel to a total amount of data flowing over the NR channel and the legacy channel.

In a third aspect, alone or in combination with one or more of the first and second aspects, the indicator of the modification causes the base station to downgrade (e.g., using transmit processor 220, TX MIMO processor 230, modulator 232, antenna 234, demodulator 232, MIMO detector 236, receive processor 238, controller/processor 240, memory 242, and/or scheduler 246) a capability associated with the NR channel and causes the UE to operate (e.g., using antenna 252, demodulator 254, MIMO detector 256, receive processor 258, transmit processor 264, TX MIMO processor 266, modulator 254, controller/processor 280, and/or memory 282) without blanking for the legacy channel.

In a fourth aspect, alone or in combination with one or more of the first through third aspects, the indicator of the modification includes a TAU.

In a fifth aspect, alone or in combination with one or more of the first through fourth aspects, the indicator of the modification is further based at least in part on a quantity of downlink layers on the NR channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: receiving, from a base station, an indicator of a data split between a New Radio (NR) channel and a legacy channel; and transmitting, to the base station, an indicator of a modification of the data split based at least in part on a ratio of an amount of data flowing over the NR channel to a total amount of data flowing over the NR channel and the legacy channel.

Aspect 2: The method of Aspect 1, wherein the NR channel and the legacy channel comprise downlink channels.

Aspect 3: The method of Aspect 2, wherein the indicator of the modification is further based at least in part on a quantity of downlink layers on the NR channel.

Aspect 4: The method of any of Aspects 2 through 3, wherein the indicator of the modification causes the base station to downgrade a capability associated with the NR channel and causes the UE to operate without blanking for the legacy channel.

Aspect 5: The method of Aspect 1, wherein the NR channel and the legacy channel comprise uplink channels.

Aspect 6: The method of Aspect 5, wherein the indicator of the modification causes the UE to transmit more data on the NR channel and to operate with blanking for the legacy channel.

Aspect 7: The method of any of Aspects 5 through 6, wherein the indicator of the modification includes at least one of a modified buffer status report (BSR) or a request for one or more additional uplink grants from the base station.

Aspect 8: The method of any of Aspects 1 through 4, wherein the indicator of the modification includes a tracking area update (TAU).

Aspect 9: The method of any of Aspects 1 through 8, wherein the indicator of the modification of the data split is further based at least in part on an indicator of a quality of the legacy channel.

Aspect 10: A method of wireless communication performed by a base station, comprising: transmitting, to a user equipment (UE), an indicator of a data split between a New Radio (NR) channel and a legacy channel; and receiving, from the UE, an indicator of a modification of the data split based at least in part on a ratio of an amount of data flowing over the NR channel to a total amount of data flowing over the NR channel and the legacy channel.

Aspect 11: The method of Aspect 10, wherein the NR channel and the legacy channel comprise downlink channels.

Aspect 12: The method of Aspect 11, wherein the indicator of the modification is further based at least in part on a quantity of downlink layers on the NR channel.

Aspect 13: The method of any of Aspects 11 through 12, wherein the indicator of the modification causes the base station to downgrade a capability associated with the NR channel and causes the UE to operate without blanking for the legacy channel.

Aspect 14: The method of Aspect 10, wherein the NR channel and the legacy channel comprise uplink channels.

Aspect 15: The method of Aspect 14, wherein the indicator of the modification causes the UE to transmit more data on the NR channel and to operate with blanking for the legacy channel.

Aspect 16: The method of any of Aspects 14 through 15, wherein the indicator of the modification includes at least one of a modified buffer status report (BSR) or a request for one or more additional uplink grants from the base station.

Aspect 17: The method of any of Aspects 10 through 13, wherein the indicator of the modification includes a tracking area update (TAU).

Aspect 18: The method of any of Aspects 10 through 17, wherein the indicator of the modification of the data split is further based at least in part on an indicator of a quality of the legacy channel.

Aspect 19: A method of wireless communication performed by a user equipment (UE), comprising: receiving, from a base station, an indicator of a data split between a New Radio (NR) channel and a legacy channel; and transmitting, to the base station, an indicator of a modification of the data split based at least in part on an indicator of a quality of the legacy channel.

Aspect 20: The method of Aspect 19, wherein the indicator of the quality of the legacy channel includes a signal-to-noise ratio (SNR).

Aspect 21: The method of any of Aspects 19 through 20, wherein the indicator of the modification is further based at least in part on a proportion of data flowing over the NR channel to a total amount of data flowing over the NR channel and the legacy channel.

Aspect 22: The method of any of Aspects 19 through 21, wherein the indicator of the modification causes the base station to downgrade a capability associated with the NR channel and causes the UE to operate without blanking for the legacy channel.

Aspect 23: The method of any of Aspects 19 through 22, wherein the indicator of the modification includes a tracking area update (TAU).

Aspect 24: The method of any of Aspects 19 through 23, wherein the indicator of the modification is further based at least in part on a quantity of downlink layers on the NR channel.

Aspect 25: A method of wireless communication performed by a base station, comprising: transmitting, to a user equipment (UE), an indicator of a data split between a New Radio (NR) channel and a legacy channel; and receiving, from the UE, an indicator of a modification of the data split based at least in part on an indicator of a quality of the legacy channel.

Aspect 26: The method of Aspect 25, wherein the indicator of the quality of the legacy channel includes a signal-to-noise ratio (SNR).

Aspect 27: The method of any of Aspects 25 through 26, wherein the indicator of the modification is further based at least in part on a proportion of data flowing over the NR channel to a total amount of data flowing over the NR channel and the legacy channel.

Aspect 28: The method of any of Aspects 25 through 27, wherein the indicator of the modification causes the base station to downgrade a capability associated with the NR channel and causes the UE to operate without blanking for the legacy channel.

Aspect 29: The method of any of Aspects 25 through 28, wherein the indicator of the modification includes a tracking area update (TAU).

Aspect 30: The method of any of Aspects 25 through 29, wherein the indicator of the modification is further based at least in part on a quantity of downlink layers on the NR channel.

Aspect 31: An apparatus for wireless communication at a device, comprising a processor; memory coupled with the processor; and instructions stored in the memory and executable by the processor to cause the apparatus to perform the method of one or more of Aspects 1-9.

Aspect 32: A device for wireless communication, comprising a memory and one or more processors coupled to the memory, the one or more processors configured to perform the method of one or more of Aspects 1-9.

Aspect 33: An apparatus for wireless communication, comprising at least one means for performing the method of one or more of Aspects 1-9.

Aspect 34: A non-transitory computer-readable medium storing code for wireless communication, the code comprising instructions executable by a processor to perform the method of one or more of Aspects 1-9.

Aspect 35: A non-transitory computer-readable medium storing a set of instructions for wireless communication, the set of instructions comprising one or more instructions that, when executed by one or more processors of a device, cause the device to perform the method of one or more of Aspects 1-9.

Aspect 36: An apparatus for wireless communication at a device, comprising a processor; memory coupled with the processor; and instructions stored in the memory and executable by the processor to cause the apparatus to perform the method of one or more of Aspects 10-18.

Aspect 37: A device for wireless communication, comprising a memory and one or more processors coupled to the memory, the one or more processors configured to perform the method of one or more of Aspects 10-18.

Aspect 38: An apparatus for wireless communication, comprising at least one means for performing the method of one or more of Aspects 10-18.

Aspect 39: A non-transitory computer-readable medium storing code for wireless communication, the code comprising instructions executable by a processor to perform the method of one or more of Aspects 10-18.

Aspect 40: A non-transitory computer-readable medium storing a set of instructions for wireless communication, the set of instructions comprising one or more instructions that, when executed by one or more processors of a device, cause the device to perform the method of one or more of Aspects 10-18.

Aspect 41: An apparatus for wireless communication at a device, comprising a processor; memory coupled with the processor; and instructions stored in the memory and executable by the processor to cause the apparatus to perform the method of one or more of Aspects 19-24.

Aspect 42: A device for wireless communication, comprising a memory and one or more processors coupled to the memory, the one or more processors configured to perform the method of one or more of Aspects 19-24.

Aspect 43: An apparatus for wireless communication, comprising at least one means for performing the method of one or more of Aspects 19-24.

Aspect 44: A non-transitory computer-readable medium storing code for wireless communication, the code comprising instructions executable by a processor to perform the method of one or more of Aspects 19-24.

Aspect 45: A non-transitory computer-readable medium storing a set of instructions for wireless communication, the set of instructions comprising one or more instructions that, when executed by one or more processors of a device, cause the device to perform the method of one or more of Aspects 19-24.

Aspect 46: An apparatus for wireless communication at a device, comprising a processor; memory coupled with the processor; and instructions stored in the memory and executable by the processor to cause the apparatus to perform the method of one or more of Aspects 25-30.

Aspect 47: A device for wireless communication, comprising a memory and one or more processors coupled to the memory, the one or more processors configured to perform the method of one or more of Aspects 25-30.

Aspect 48: An apparatus for wireless communication, comprising at least one means for performing the method of one or more of Aspects 25-30.

Aspect 49: A non-transitory computer-readable medium storing code for wireless communication, the code comprising instructions executable by a processor to perform the method of one or more of Aspects 25-30.

Aspect 50: A non-transitory computer-readable medium storing a set of instructions for wireless communication, the set of instructions comprising one or more instructions that, when executed by one or more processors of a device, cause the device to perform the method of one or more of Aspects 25-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors coupled to the one or more memories, the one or more memories and the one or more processors configured to:
receive, from a network node, an indicator of a data split between a New Radio (NR) channel and a legacy channel;
transmit, to the network node, an indicator of a modification of the data split based at least in part on a ratio of an amount of data flowing over the NR channel to a total amount of data flowing over the NR channel and the legacy channel; and
use the indicator of the modification to selectively:
operate with blanking for the legacy channel based at least in part on the ratio satisfying a data threshold, or
operate without blanking for the legacy channel based at least in part on the ratio failing to satisfy the data threshold.

2. The apparatus of claim 1, wherein the NR channel and the legacy channel comprise downlink channels.

3. The apparatus of claim 2, wherein the indicator of the modification is further based at least in part on a quantity of downlink layers on the NR channel.

4. The apparatus of claim 1, wherein the indicator of the modification causes the network node to downgrade a capability associated with the NR channel.

5. The apparatus of claim 1, wherein the NR channel and the legacy channel comprise uplink channels.

6. The apparatus of claim 1, wherein the one or more memories and the one or more processors are further configured to transmit more data on the NR channel and to operate with blanking for the legacy channel based at least in part on the ratio satisfying a data threshold.

7. The apparatus of claim 6, wherein the indicator of the modification includes at least one of a modified buffer status report (BSR) or a request for one or more additional uplink grants from the network node.

8. The apparatus of claim 1, wherein the indicator of the modification includes a tracking area update (TAU).

9. The apparatus of claim 1, wherein the indicator of the modification of the data split is further based at least in part on an indicator of a quality of the legacy channel.

10. An apparatus for wireless communication at a network node, comprising:
one or more memories; and
one or more processors coupled to the one or more memories, the one or more memories and the one or more processors configured to:
transmit, to a user equipment (UE), an indicator of a data split between a New Radio (NR) channel and a legacy channel; and
receive, from the UE, an indicator of a modification of the data split based at least in part on a ratio of an amount of data flowing over the NR channel to a total amount of data flowing over the NR channel and the legacy channel, wherein the indicator of the modification indicates a selection by the UE to:
operate with blanking for the legacy channel based at least in part on the ratio satisfying a data threshold, or
operate without blanking for the legacy channel based at least in part on the ratio failing to satisfy the data threshold.

11. The apparatus of claim 10, wherein the NR channel and the legacy channel comprise downlink channels.

12. The apparatus of claim 11, wherein the indicator of the modification is further based at least in part on a quantity of downlink layers on the NR channel.

13. The apparatus of claim 10, wherein the indicator of the modification causes the network node to downgrade a capability associated with the NR channel.

14. The apparatus of claim 10, wherein the NR channel and the legacy channel comprise uplink channels.

15. The apparatus of claim 10, wherein the indicator of the modification indicates that the UE is, based at least in part on the ratio satisfying a data threshold to transmit more data on the NR channel and to operate with blanking for the legacy channel.

16. The apparatus of claim 15, wherein the indicator of the modification includes at least one of a modified buffer status report (BSR) or a request for one or more additional uplink grants from the network node.

17. The apparatus of claim 10, wherein the indicator of the modification includes a tracking area update (TAU).

18. The apparatus of claim 10, wherein the indicator of the modification of the data split is further based at least in part on an indicator of a quality of the legacy channel.

19. An apparatus for wireless communication at a user equipment (UE), comprising:
one or more memories; and
one or more processors coupled to the one or more memories, the one or more memories and the one or more processors configured to:
receive, from a network node, an indicator of a data split between a New Radio (NR) channel and a legacy channel;
transmit, to the network node, an indicator of a modification of the data split based at least in part on an indicator of a quality of the legacy channel; and
use the indicator of the modification to selectively:
operate with blanking for the legacy channel based at least in part on the quality satisfying a quality threshold, or
operate without blanking for the legacy channel based at least in part on the quality satisfying a quality threshold.

20. The apparatus of claim 19, wherein the indicator of the quality of the legacy channel includes a signal-to-noise ratio (SNR).

21. The apparatus of claim 19, wherein the indicator of the modification is further based at least in part on a proportion of data flowing over the NR channel to a total amount of data flowing over the NR channel and the legacy channel.

22. The apparatus of claim 19, wherein the indicator of the modification causes the network node to downgrade a capability associated with the NR channel.

23. The apparatus of claim 19, wherein the indicator of the modification includes a tracking area update (TAU).

24. The apparatus of claim 19, wherein the indicator of the modification is further based at least in part on a quantity of downlink layers on the NR channel.

25. An apparatus for wireless communication at a network node, comprising:
one or more memories; and
one or more processors coupled to the one or more memories, the one or more memories and the one or more processors configured to:
transmit, to a user equipment (UE), an indicator of a data split between a New Radio (NR) channel and a legacy channel; and
receive, from the UE, an indicator of a modification of the data split based at least in part on an indicator of a quality of the legacy channel, wherein the indicator of the modification indicates a selection by the UE to:
operate with blanking for the legacy channel based at least in part on the quality satisfying a quality threshold, or
operate without blanking for the legacy channel based at least in part on the quality failing to satisfy the quality threshold.

26. The apparatus of claim 25, wherein the indicator of the quality of the legacy channel includes a signal-to-noise ratio (SNR).

27. The apparatus of claim 25, wherein the indicator of the modification is further based at least in part on a proportion of data flowing over the NR channel to a total amount of data flowing over the NR channel and the legacy channel.

28. The apparatus of claim 25, wherein the indicator of the modification causes the network node to downgrade a capability associated with the NR channel and causes the UE to operate without blanking for the legacy channel.

29. The apparatus of claim 25, wherein the indicator of the modification includes a tracking area update (TAU).

30. The apparatus of claim 25, wherein the indicator of the modification is further based at least in part on a quantity of downlink layers on the NR channel.

* * * * *